June 7, 1966  H. C. KENT ETAL  3,254,864
CONTROL APPARATUS

Filed April 28, 1964  2 Sheets-Sheet 1

INVENTORS.
HOLGER C. KENT
JEFFREY M. LAZAR
& JOHN H. LINDAHL
BY
Gordon Reed
ATTORNEY United States Patent Office 3,254,864
Patented June 7, 1966

3,254,864
CONTROL APPARATUS
Holger C. Kent, Anoka, Jeffrey M. Lazar, St. Paul, and John H. Lindahl, Wayzata, Minn., assignors to Honeywell Inc., Minneapolis, Minn., a corporation of Delaware
Filed Apr. 28, 1964, Ser. No. 363,126
4 Claims. (Cl. 244—78)

This invention relates to control apparatus for a craft supported in a fluid medium and particularly to a control apparatus such as an automatic pilot which utilizes the principles of fluid dynamics for sensing, amplifying, and moment producing or the flow of such fluid both in its sensors, amplifiers, and craft control surface actuating means so that the system has few moving parts and functions by the fluid are analogous to the functions performed now being performed by electrical components and systems or electro-hydraulic components and systems having a greater number of moving parts and hence less reliable.

Broadly therefore it is an object of this invention to provide a fluid flow responsive and fluid operated apparatus which performs the functions analogous to the function performed by existing systems utilizing sensors having electrical transducers and electrical operating means for an aircraft surface or a system utilizing electrical transducers and hydraulic or fluid operated control surfaces positioning means wherein such electrical devices may be adversely affected by atmospheric or nuclear radiations.

It is an object of this invention to utilize a medium such as air for three purposes namely for supporting a vehicle, for operating attitude control means of the vehicle, and thirdly for acting on sensors thereby utilizing the same medium to detect a change in a vehicle condition.

It is also an object of this invention to provide a fluid to variably control a condition sensor and to operate condition changing means for an aircraft, for controlling the attitude thereof.

It is further an object of this invention to provide an all fluid system which utilizes the principles of fluid dynamics in its control devices or sensors and in its controlled devices such as servo motors which thus require less moving parts and thus less mechanical wear and consequently are more reliable than in earlier systems having electrical sensors and electro-hydraulic servo control systems.

Figure 1:
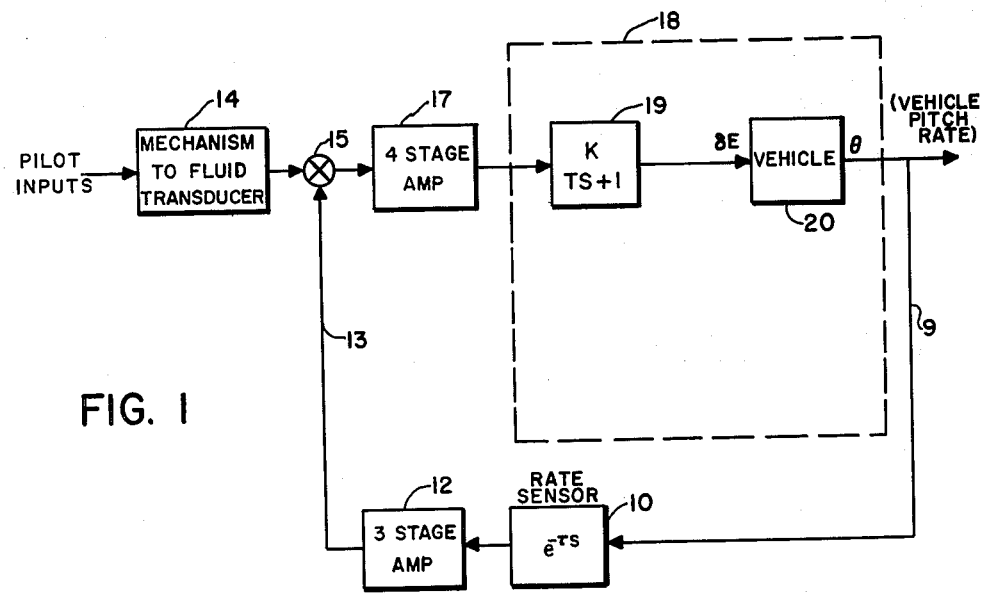
Figure 2:
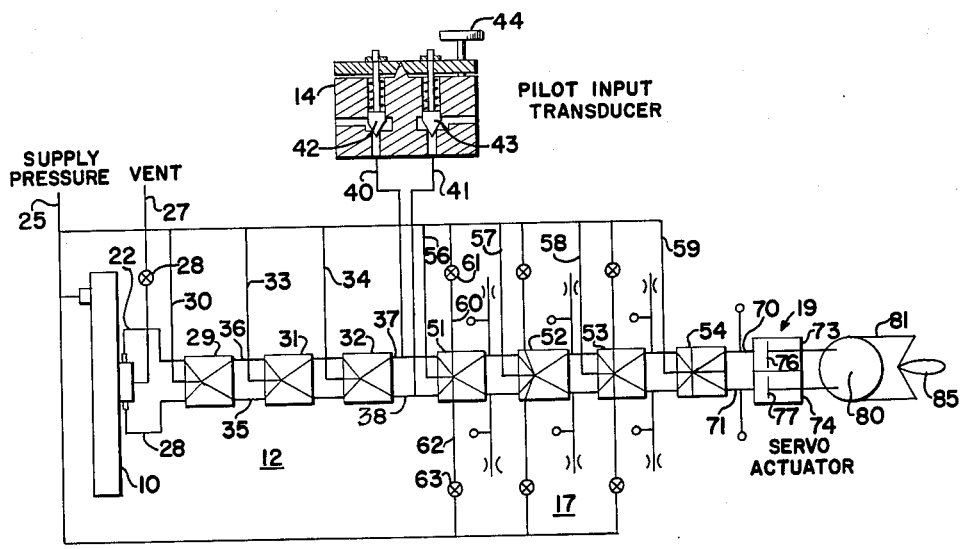
Figure 3:
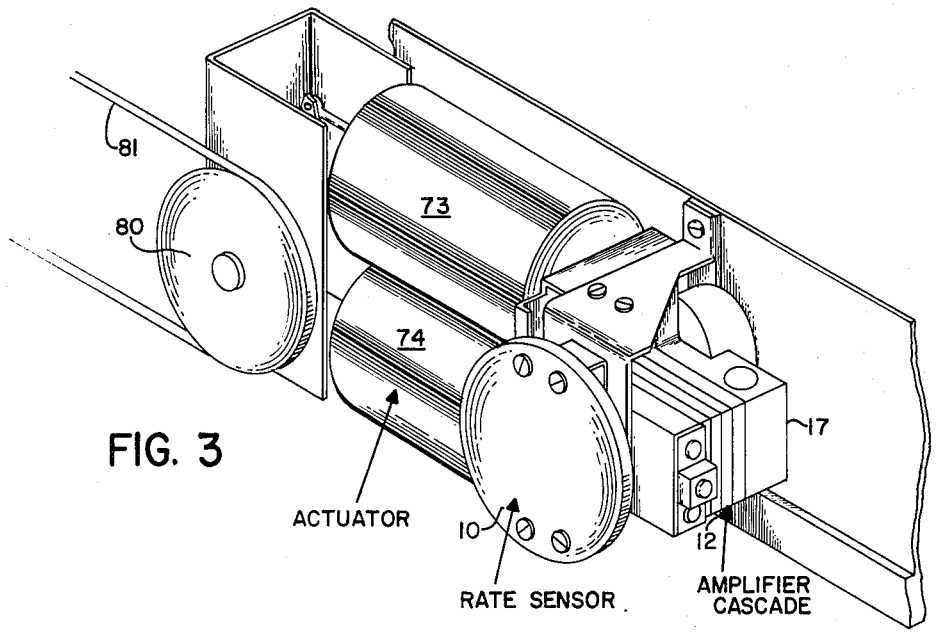
Figure 4:
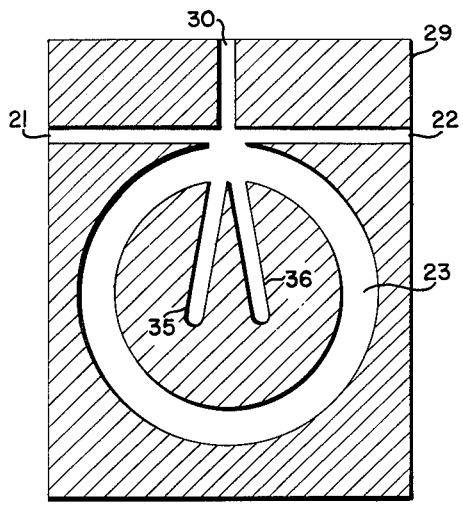
Figure 5:
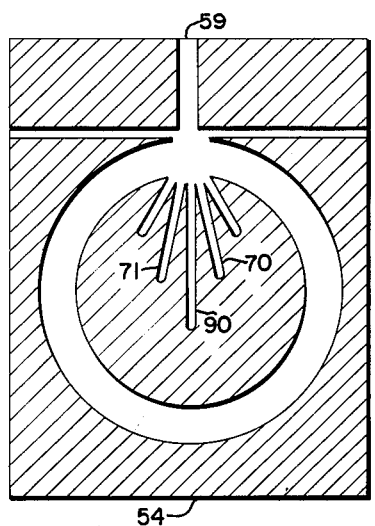

The above and other objects, features, and advantages of this invention will become apparent upon consideration of the following detailed description taken in conjunction with the accompanying drawings, wherein:

FIGURE 1 is a block diagram of the all fluid system;
FIGURE 2 is a schematic of the all fluid condition control apparatus;
FIGURE 3 shows the system in a compact arrangement;
FIGURE 4 is a cross section of a non-center exhaust-proportional-fluid amplifier with a circular crossover; and
FIGURE 5 is a cross section of a center exhaust-proportional-amplifier with a circular crossover.

The all fluid concept applicable to control apparatus of a condition of a vehicle, for the purpose of illustrating the invention has been applied to all fluid apparatus for damping an aircraft about its pitch axis and thus may be referred to as an aircraft pitch-rate damper. The damper system for craft angular rates includes a craft angular rate sensor, proportional amplifiers with means of summing, shaping networks if required, and a power amplifier for the operating means that position the aircraft moment producer such as a pitch attitude control surface. A pilot command input is provided for nulling purposes and also for providing pilot command capabilities. The rate sensor is a vortex rate sensor, which uses the principles of fluid flow for the measurement of vehicle turning rates, the proportional amplifiers and the power amplifier are fluid amplifiers with no moving parts and thus the sensor, the amplifier, and the aircraft surface positioning means utilize the same media or fluid. This same fluid may support the aircraft or vehicle while in motion.

Referring to FIGURE 1, which is a block diagram of a fluid control system, aircraft change in positions or angular motions such as the aircraft pitch rate is supplied by transmitting means 9 to a rate sensor 10 which has its output signal supplied to a three stage amplifier arrangement 12. The output from the three stage amplifier arrangement 12 is supplied over transmitting means 13 as an input to a summing device 15. The summing device 15 also receives pilot inputs from a pilot operated transducer 14. The output from summing device 15 is supplied to a four stage amplifier arrangement 17. The output from this four stage amplifier arrangement 17 is transmitted to an actuating means 18 of attitude changing means of the craft. Such actuating means has its output lagged with respect to its input as represented by the lag device 19. The output from the actuating means 18 positions the attitude changing means of the aircraft 20 such as an elevator of an aircraft for example and damps the initial cause of the disturbance resulting in the original craft motion.

In FIGURE 2 which is a schematic diagram of the pure fluid flight control system utilizing dynamic fluid principles, a condition of an aircraft such as its angular rate about an axis is sensed by the rate sensor 10 which in this pure fluid system takes the form of a vortex rate sensor. This fluid vortex rate sensor may be similar to that described in a prior patent application of Richard J. Reilly, Serial No. 156,613 filed December 4, 1961. Such rate sensor is provided with pressure lines 21, 22 that correspond with pressure port 63, 64 of the aforesaid Reilly patent application. Depending upon the direction and the rate of angular motion, the pressure in one line 21 may exceed or be less than that in line 22. The fluid vortex rate sensor 10 receives a media such as air over a pressure supply line 25. This pressure supply line 25 may be connected to an engine driven pump on the craft with the pressure roughly about 10 p.s.i. The fluid rate sensor 10 is provided with a vent line 27 extending therefrom with the line including an adjustable control or valve 28. The fluid rate sensor has as its principle of operation the generation of a logarithmic streamline within a flow field whenever a turning rate is applied to its case or housing. The motion of the fluid can be translated into fluid signals expressed in pressure or flow values.

If the aircraft has a mechanical motion such as an angular rate, a low energy differential air pressure exists in lines 21, 22 which is applied to the control nozzles of a first fluid amplifier 29 in the three amplifier stage arrangement 12. In cascade arrangement with fluid amplifier 29 are fluid amplifiers 31, 32. Amplifiers 29, 31, 32 are of the proportional type which produce a pressure differential output proportional to the input pressure differential which is considered a low energy stream. Such input pressure differential is that, for example, transmitted through conduits 21, 22 to amplifier 29. Amplifier 29 conventionally includes a power nozzle which receives fluid from a fluid supply passage connected to conduit 30 extending from the high energy main supply line 25. Output passages 35, 36 of amplifier 29 supply the input control pressures to cascaded amplifier 31 which has a main nozzle connected through sub-conduit 33 to the main supply line 25. Since the change in control input differential is smaller than the change in output differential resulting from jet deflections a gain is present.

Similarly, the output channels of amplifier 31 supply input control pressures to the third stage amplifier 32 which has its main nozzle supplied with fluid through subconduit 34 from the main supply pressure line 25.

Proportional fluid amplifiers which provide an output varying in magnitude in accordance with the differential control pressure applied to its main nozzle and in which the controlled jet attachment is avoided by cross over are old in the art. In the subject arrangement, the aspect ratio which is the ratio of height of the flow channel to width is 0.5 for fluid amplifiers 29, 31. This aspect ratio was selected for proper impedance matching with the fluid rate sensor 10.

Output channels of fluid amplifier 32 are connected to conduits 37, 38. Connected with conduit 38 is a subconduit 41 extending to a needle valve 43 of the pilot input transducer 41. Similarly extending from conduit 37 is a subconduit 40 which extends to a needle valve 42 in the pilot input transducer 14. The needle valves 42, 43 have suitable coacting seats and are differentially operated by operable means 44 in that as one valve is moved away from its seat, the other valve will approach its seat.

The pilot input transducer 14 is a simple variable flow pressure adjustment, which varies with differential output pressure of the third stage 32 as reflected in the differential pressure in conduits 37, 38.

The four stage cascaded fluid amplifier arrangement 17 comprises the amplifiers 51, 52, 53 and 54. Amplifiers 51, 52, 53 and 54 are connected to the main supply conduit 25 through their respective subconduits 56, 57, 58, and 59. Amplifiers 51, 52, 53 are provided with nulling adjustments. An illustraiton of the nulling adjustment is described with respect to amplifier 51 and the nulling adjustments are duplicated for amplifiers 52, 53. The nulling adjustment for amplifier 51 consists of a subconduit 60 extending from the main nozzle of fluid amplifier 51 to the main supply line 25 which is controlled by an operable valve 61. Similarly, a subconduit 62 extending from the opposite side of the main nozzle of amplifier 51 extends to the main supply pressure line 25 and is controlled by a valve 63.

Nulling of amplifiers 51, 52 and 53 has a definite effect on the gain around the null position of the complete cascade 17. If each amplifier is not nulled the maximum gain of each amplifier may not fall in the overall cascade null region and therefore cause decrease gain at this position. An amplifier has a linear output region in an area of either side of null. If an amplifier is operating over a range outside of this region the gain will decrease. Therefore, each amplifier in the system should be nulled for the maximum gain region in order to obtain the maximum system gain.

The fluid amplifiers in cascade arrangement 17 also are of the proportional type which produce a pressure differential output proportional to the input signal pressure differential which is applied conventionally at right angles to the flow of the main nozzle of each amplifier. While amplifiers 51, 52, and 53 are of the non-center exhaust type, amplifier 54 is of the center exhaust type. The non-center exhaust unit transmits its total flow out the output channels, whereas, the center exhaust unit exhausts the flow not required for the succeeding stage, or in the case of dead ended operation into an actuator, exhausts the total or partial flow depending upon whether or not the actuator is operating.

The output channels of amplifier 54 are connected through conduits 70, 71 to the cylinders of two servo motors sections 73, 74 of servomotor 19. The pressure in cylinders 73, 74 are applied to rams 76, 77 which are differentially moved in accordance with the difference in pressure in conduits 70, 71. The rams 76, 77 are connected for operation to a cable drum for example having cables 81 extending therefrom to the attitude changing means of the vehicle or aircraft. Such attitude changing means may for example be a control surface of an aircraft.

As shown in FIGURE 3, the fluid operated rate sensor and fluid type amplifier cascades 12, 17 are preferably designed for close proximity to each other and to the fluid (air) actuator or servomotor 19 comprising cylinders 73, 74 to keep the conduit length to a minimum and reduce the capacitive effect.

FIGURE 4 shows details of a proportional fluid amplifier, similar to amplifier 29 of FIGURE 2, and it is of the non-center exhaust type. Amplifier 29 has its nozzle connected to the main pressure line through subconduit 30 and has applied thereto, at right angles to the flow through the main nozzle, differential pressure signals over conduits 21, 22. The output channels 35, 36 are connected to the input control conduits of the following stage 31. Amplifier 29 includes a circular cross over 23 out of the plane of channels 35, 36 which links the output channels by a low impedance path which breaks down boundary layer effects to provide the conventional proportional effect so that the differential pressure or relative change in momentum in output channels 35, 36 is in proportion to the input differential pressure signals in conduits 21, 22.

FIGURE 5 shows details of fluid amplifier 54 which is of the center exhaust type and provided with a circular cross over. Its output channels are connected to conduits 70, 71 for operation of the actuator 19. Since the conduits 70, 71 are dead ended into cylinders 73, 74 of actuator 19, a center exhaust 90 permits escape of the partial flow if the actuator is operating. That is to say if ram 76 FIGURE 2 is moved toward the right causing the movement of ram 77 toward the left, the center exhaust 90 permits the escape of the fluid (air) from cylinder 74.

The gains such as system pressure gains depend upon the sensor scale factor relative to the overall system rate gain. For example, if the differential pressure applied to the actuator cylinders 73, 74 is one p.s.i./degree/second angular rate and if the scale factor of the fluid craft angular rate sensor 10 be .004 p.s.i./degree/second angular rate, system pressure gain of 250 is required.

Similarly, the size of the final amplifier 54 of the cascade 17 is determined by the flow required for the time constant of the actuator 19. A rough figure is .12-second time constant for 4.5 c.f.m. into the actuator 19. The flow required by the power amplifier for operating the actuator through 60% of its stroke in .12 second.

It will now be apparent that there has been provided a novel pure fluid flight control system, having few moving and thus few mechanical wearing surfaces, such system improves the dynamic stability of an aircraft and the system utilizes the principles of fluid dynamics in that it includes a fluid type rate sensor sensing small aircraft angular rates which control a number of fluid amplifiers in cascade arrangement, which can amplify fluid signals rather than transduce them to electrical form for amplication, to attain the desired pressure and flow gains culminating in a power amplifier output sufficient for direct operation of attitude changing means such as an elevator surface of an aircraft. The output from the power amplifier is the same media (air) as that supplied to the fluid type rate sensor and in the case of aircraft is similar to the media supporting such aircraft in flight.

While there has been described and illustrated in the drawings a specific embodiment of the invention, it will be clear that variations in the details of construction from that specifically illustrated and described may be resorted to without departing from the spirit and scope of the invention as defined in the appended claims.

What is claimed is:

1. In control apparatus for an aircraft having attitude changing means:

a craft movement responsive fluid vortex rate transducer having a pressurized supply line and two output lines providing an output consisting of two different fluid pressures in said output lines in accordance with a flight condition of said aircraft;

fluid amplifier means having a power nozzle emitting high pressure fluid which is deflected by differential pressure flow through a pair of control ports connected to the transducer and thereby controlled by said transducer; and means controlled by the deflection of the high pressure fluid in the fluid amplifier means operating the attitude changing means for the craft to correct the flight condition.

2. A pure fluid rate damper for an aircraft having an attitude control surface comprising:

a fluid vortex rate sensor, having a fluid supply line and two output lines, sensing craft angular rate about an axis and providing differential fluid pressure in its output lines in accordance with the craft angular rate;

a proportional fluid amplifier having a power nozzle, a pair of laterally arranged control passages receiving the differential fluid pressure from the rate sensor, and a pair of discharge passages; and a fluid type power amplifier with control ports connected to the discharge passages of the proportional fluid amplifier and having a pair of output channels, a center exhaust, and a power nozzle, said output channels connected to servo means for operating the attitude changing means, said center exhaust transmitting the total or partial flow depending on whether or not the servo means is operating.

3. In control apparatus for an aircraft, a fluid amplifier including a power nozzle, a first and second control nozzle, and a first and second output channel;

means for providing fluid control signals for said first and second control nozzles, said last named means including a fluid vortex rate sensor sensing the angular rate of said craft about an axis, said fluid amplifier output channels selectively ejecting fluid in accordance with differential flow through the control nozzles for angular rate of the flight of said aircraft.

4. Control apparatus for an aircraft comprising a pure fluid amplifier including a first power nozzle means for issuing a stream of fluid, a pair of output channels positioned in fluid receiving relationship to said stream of fluid, a control means for applying a differential pressure across said issuing stream of fluid to deflect said stream and thereby vary differentially the relative proportion of the stream received by said output channels;

fluid vortex rate means having an engine pressurized supply line and two output lines for developing differential fluid signals in the output lines which are a function of the angular rate of deviation of the vehicle from a position of the vehicle in its fluid medium;

means connected to the vortex rate means for applying fluid control signals to said control means; and means for supplying to attitude changing means of the craft fluid signals developed in said output channels of said pure fluid amplifier in such sense as to damp the deviation of the vehicle from its position.

References Cited by the Examiner

UNITED STATES PATENTS 3,027,121 3/1962 Griswold _____ 244—78
3,137,464 6/1964 Horton _____ 244—78

FOREIGN PATENTS 547,555 9/1942 Great Britain.

MILTON BUCHLER, *Primary Examiner.*

ANDREW H. FARRELL, *Examiner.*